United States Patent [19]

De Felice et al.

[11] Patent Number: 4,688,243
[45] Date of Patent: Aug. 18, 1987

[54] DAYLIGHT X-RAY CASSETTE HAVING VARIABLE SIZE LEAF SPRINGS

[75] Inventors: Charles P. De Felice, Wilmington, Del.; Donald F. Le Roux, Elkton, Md.

[73] Assignee: E. I. Du Pont de Nemours and Company, Wilmington, Del.

[21] Appl. No.: 767,334

[22] Filed: Aug. 21, 1985

[51] Int. Cl.$^4$ .............................................. G03B 17/26
[52] U.S. Cl. .................................................. 378/187
[58] Field of Search ........................ 378/182, 187, 188

[56] References Cited

U.S. PATENT DOCUMENTS

| | | |
|---|---|---|
| 3,153,145 | 10/1964 | Yerkovich . |
| 3,784,835 | 1/1974 | Schmidt . |
| 3,870,889 | 3/1975 | Schmidt . |
| 3,930,165 | 12/1975 | Robinson et al. . |
| 4,032,790 | 6/1977 | Nakamura . |
| 4,181,418 | 1/1980 | Fechtner et al. . |
| 4,186,308 | 1/1980 | Erikson . |
| 4,198,009 | 4/1980 | Turner . |
| 4,383,330 | 5/1983 | De Felice et al. . |
| 4,418,420 | 11/1983 | Bauer et al. ........................ 378/187 |
| 4,444,484 | 4/1984 | Best et al. . |

Primary Examiner—Frederick R. Schmidt
Assistant Examiner—Steven P. Schad

[57] ABSTRACT

X-ray cassette having a casing, a fixed plate and a moveable plate within the casing, a film receivable between the plates, bias means including a cam riding surface for biasing the moveable plate toward the fixed plate by means of an actuating cam assembly, the biasing means including a pressure applying strap comprising a plurality of leaf spring elements, having variable cross-section and length, i.e., larger and longer as the leaf spring elements extend toward the center of the cassette. A buckler element may be present in the cassette to buckle the film from the plate.

5 Claims, 5 Drawing Figures

DAYLIGHT X-RAY CASSETTE HAVING VARIABLE SIZE LEAF SPRINGS

TECHNICAL FIELD

This invention relates to an X-ray cassette. More particularly this invention relates to a daylight X-ray cassette having variable pressure applying means for applying pressure to a film sheet placed between two substantially flat plates.

BACKGROUND OF THE INVENTION

In the development of X-ray film handling systems, the equipment has been provided which allows the automatic loading and unloading of X-ray film into a cassette under daylight conditions. Such equipment frees the operator from the need to load and unload the film to and from a cassette in a dark room. Exemplary of such an automatic system is that disclosed in Schmidt U.S. Pat. No. Re. 28,438. This reissue patent describes an X-ray film package for use with the daylight loading cassette of the type disclosed in Schmidt U.S. Pat. Nos. 3,784,835 and 3,870,889. Schmidt U.S. Pat. No. 3,715,087 describes a device used for unloading cassettes of the last mentioned patents under daylight conditions.

In operation, a film sheet is automatically loaded into the cassette which is operative to hold the film between two opposed substantially parallel X-ray intensifying screens during a period of patient exposure. Following exposure, the cassette is unloaded under the influence of gravity using a device as disclosed in the last mentioned patent which is adapted to release one of the two cassette plates supporting the intensifying screens to thereby relieve the holding pressure from the film sheet and allow it to drop under the influence of gravity into a light-tight container.

In designing and constructing X-ray cassettes, an important consideration is contact between a film sheet and the intensifying screens. Not only should such contact be intimate, but it should be uniform over the full area of the intensifying screens. One of the problems encountered as the X-ray cassettes are made larger, is that as the two intensifying screens are brought into contact with the film sheet placed thereinbetween, air trapped between the screen and the film thereby reducing contact and resulting in a radiographic image of poorer resolution. The problem is particularly significant when high resolution smooth surface screens are used. In order to eliminate this problem, it has been proposed to use a mounting plate for the intensifying screens which may be curved to assume either a cylindrical or circular shape. While this solution has been practiced in cassettes designed to open somewhat like a book to allow insertion of a film sheet between the two intensifying screens, such solution has not been practical in cassettes of the type disclosed above because the daylight loading cassette thickness is fixed to a small dimension corresponding to that of a closed book-type cassette. Within this limited dimension, not only must all components of the cassette be included, but, in addition, there must be allowed sufficient room for one of the screens to be able to move away from the other in order to allow the film sheet to be inserted and removed therefrom. Thus, employment of a curved intensifying screen becomes impractical for the daylight loading cassette.

A second problem typical of the aforementioned Schmidt daylight loading cassette is the time required for a film sheet to be discharged therefrom once the cassette has been placed on the film release equipment. Film discharge is obtained by releasing the pressure applied to one of the intensifying screens which forces the screen against the film sheet. If all the air has been properly excluded from between the intensifying screens and the film sheet during the loading operation, before the film can drop from the cassette, sufficient time must elapse for air to seep back between the film sheet and the screens to release the film sheet from the screens. For a variety of reasons, it is desirable that the discharge time of a film sheet from such a cassette should not exceed about three seconds.

Thus, there is still need for the development of a daylight X-ray cassette of the type discussed above in which good film screen contact is available without any increase in the thickness of the cassette and without unduly increasing the release time of a film sheet therefrom.

SUMMARY OF THE INVENTION

In accordance with this invention there is provided in an X-ray cassette of the type having a casing, a fixed plate and a moveable plate within said casing, a film sheet receivable between the plates, bias means including a cam riding surface for biasing the moveable plate towards the fixed plate by applying a biasing force, an actuating cam assembly operatively associated with the bias means to engage the cam riding surface and release the biasing force from the moveable plate when the cam assembly is in a first position and apply the biasing force when the cam assembly is in a second position, the bias means including at least one pressure applying strap comprising a plurality of leaf spring elements mounted on a supporting arm extending therefrom in a plane, the strap extending across the moveable plate, the improvement comprising a plurality of leaf spring elements of variable cross-section and length, the cross-section and length of the leaf spring elements away from the edges of the moveable plate being respectively larger and longer than the cross-section and length of the leaf spring elements adjacent the edges of the moveable plate.

The cassette may further comprise an intensifying screen secured over the fixed plate, the intensifying screen having at least a portion of at least one of its edges bent away from the moveable plate. It may further comprise a generally rectangular casing having a film entry slot in one of its edges. At least one buckler element may be located along one edge of the fixed plate within the cassette. The buckler element, when present, is operatively associated with a cam assembly and is pivotably mounted on the casing to extend in the space between the fixed and moveable plates and engage an edge of the film sheet to buckle it from the plate and thus assist its release.

BRIEF DESCRIPTION OF THE DRAWINGS

The invention may be more fully understood from the following detailed description thereof taken in connection with the accompanying drawings which form a part of this application and in which.

DETAILED DESCRIPTION OF THE INVENTION

Figure 1:
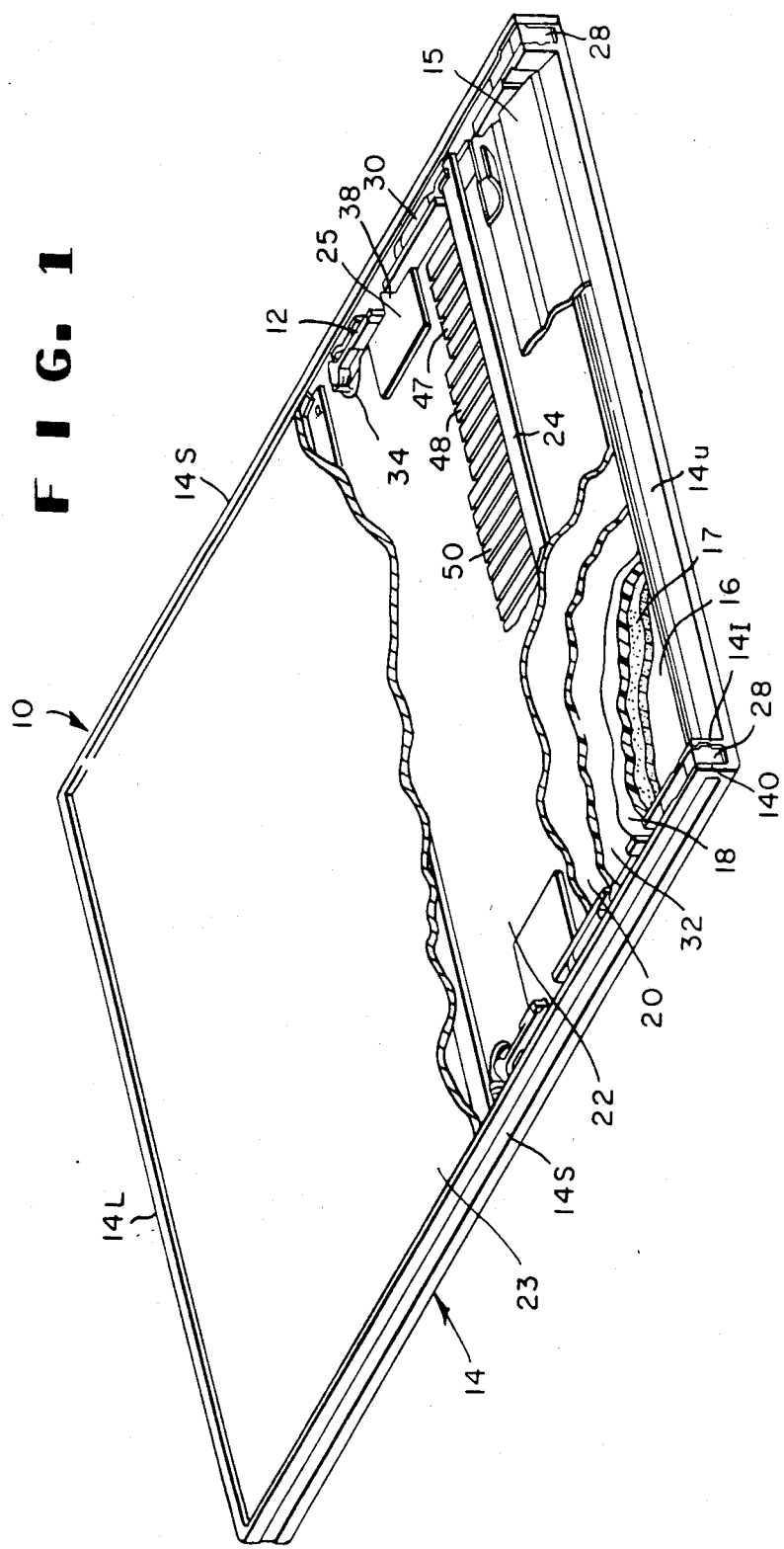
FIG. 1 is a perspective view showing the structure of an X-ray cassette in accordance with the present invention.

Throughout the following detailed description, similar reference numerals refer to similar elements in all figures of the drawings. With reference to FIG. 1 there is shown a perspective view of an X-ray cassette generally indicated by reference character 10 with which a buckler assembly 12 is utilized. The cassette 10 is formed of a rectangular frame 14 having opposed sidewalls 14S and upper and lower walls 14U and 14L, respectively. The upper frame wall 14U includes a slot through which a film sheet may be inserted or retrieved from the cassette. A light grate 15 covers the slot when the cassette is closed. On the frame 14 is mounted an opaque but X-ray transparent front or window plate 16. The window plate 16 is fixedly mounted to the rectangular frame 14. The window plate 16 may be fabricated from magnesium sheet although any suitable material meeting the above specifications, such as aluminum or a synthetic plate comprising an epoxy binder reinforced with a fibrous material such as carbon fibers or Kevlar ® aramid fibers may be employed. Disposed above the window plate 16 is a foam pad 17 and an X-ray intensifying screen 18. A second X-ray intensifying screen 20 is mounted to a backing plate 22 which is movably disposed within the frame 14. A rear plate 23 also mounted on the frame 14 completes the cassette 10. The plates 22 and 23 may be fabricated of aluminum or any other suitable material.

The side walls 14S of the frame 14 assume a channel cross-section having an inner and outer rail 14I and 14O, respectively. An appropriate number of leaf spring biasing elements 47, 48, 50 to be described in more detail below, are pivotably mounted on the inner rail 14I of the channel side walls 14S and extend transversely across the width of the frame 14. The leaf spring biasing elements act to support the backing plate 22 and bias it toward the window plate 16. Reinforcing tabs 25 may be provided in larger size cassettes to reinforce the backing plate 22.

A cam rail assembly 28 is slideably received within each of the channels. Cam surfaces 30 on the cam rail assembly 28 engage the actuate the leaf spring biasing elements to alternatively release or urge the moveable backing plate 22 against the window plate 16.

With the cam rail 28 in the first position, the biasing force imposed by the lead spring biasing elements on the back plate is released defining a space between the backing and the window plates sufficient to allow an X-ray film sheet 32 to be received between the two intensifying screens. With the cam rail 28 in a second position, the leaf spring biasing elements urge backing plate 22 towards the window plate 16 to provide intimate contact between the two intensifying screens 18 and 20 and the film sheet 32 sandwiched therebetween.

Figure 5:
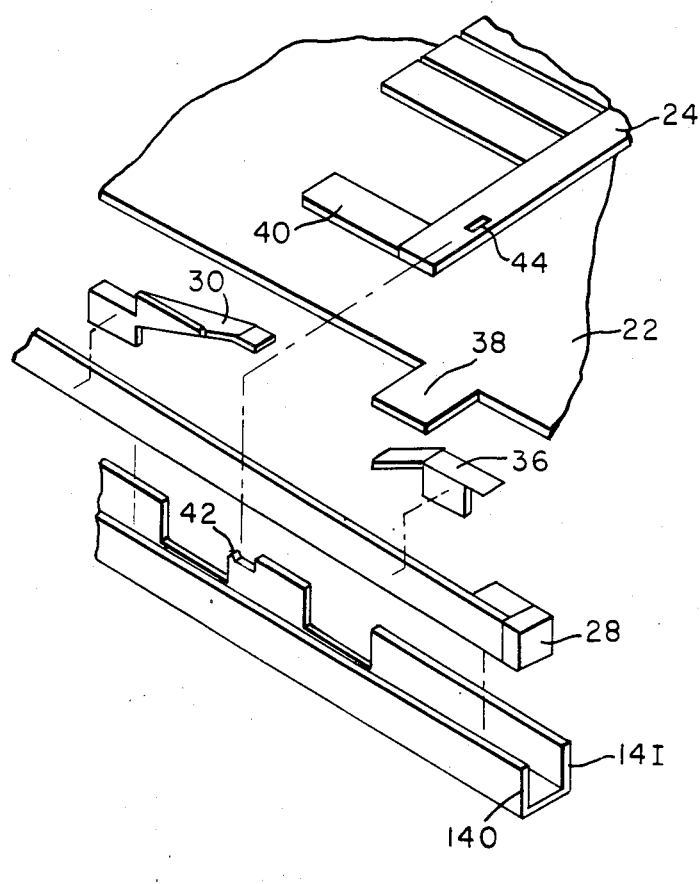
FIG. 5 is an exploded view of the details of the bias cams in accordance with this invention.

A second cam surface 36 is provided on cam rail assembly 28 as better shown in FIG. 5. Backing plate 22 includes a tab 38 which extends into the channel between inner rail 14I and outer rail 14O through an opening on the side 14I of this channel. Tab 38 which may form part of reinforcing tab 25 rides on cam surface 36 urging backing plate away from window plate 16 to open up the space between the intensifying screens and provide a space for receiving or releasing therefrom a film sheet placed between the screens. Thus, the leaf spring biasing elements together with cam surfaces 30 and 36 and tab 38 of backing plate 22 cooperate to alternatively contact or release the two intensifying screens 18 and 20 and a film sheet 32 placed therein between. The intensifying screens 18 and 20 and the backing plate 22 are provided with notches or cutouts 34 at predetermined locations thereon to facilitate the intrusion of buckler 12 into the film areas. A buckler assembly 12 of the type disclosed in DeFelice and LeRoux U.S. Pat. No. 4,383,330 is mounted along the side walls 14S of the cassette. Bucklers 12 are pivotably mounted on the side walls 14S and operatively connected to the cam rail assembly 28. As the cam rail assembly 28 moves from the second position to the first position, a cam surface on the cam rail engages a portion of buckler 12 forcing buckler 12 to extend into cutout 34 and engage the edge of the film sheet contained in the cassette. As a result of this engagement, the film sheet is buckled away from the intensifying screen to allow air to seep in the space between the film sheet and the intensifying screen, thus, speeding the release of the film sheet and reducing the drop out time of the film sheet from the cassette. Biasing means not shown, keep the buckler member away from the film sheet when the cam rail assembly 28 is in either the first or the second position. Four bucklers are preferably used to assure reliability of operation.

Figure 2:
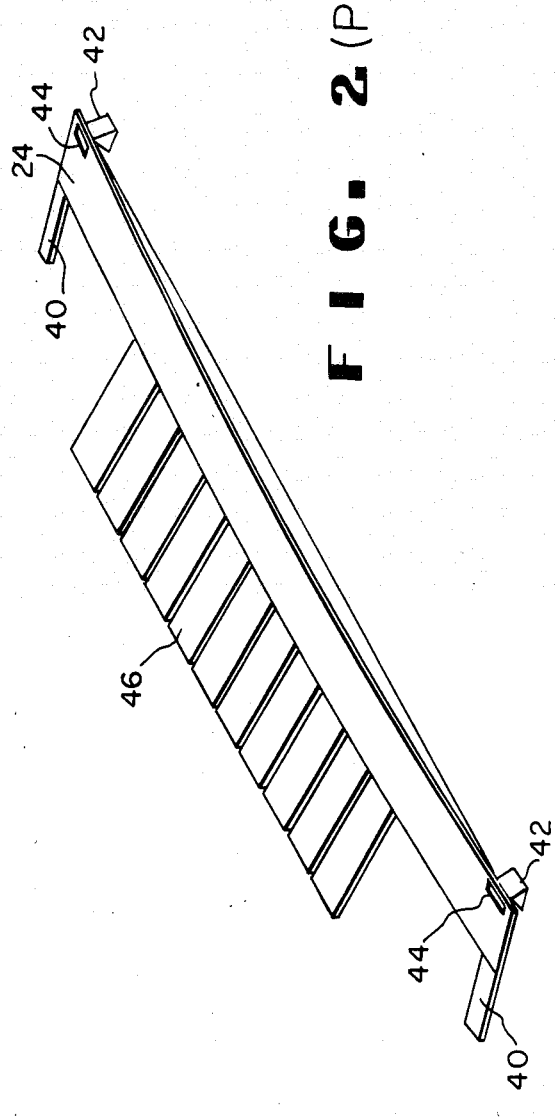
FIG. 2 is a schematic representation of leaf spring elements of the type employed in the prior art.

Referring now to FIG. 2, there is a schematic representation of a biasing element of the type employed in the prior art. This element comprises a strap 24 which extends across the full width of backing plate 22 and into channel guides of channel side walls 14S (not shown). The strap is supported on two supports 42 placed on inner rail 14I (not shown). Supports 42 engage an opening 44 on the strap. The support and opening are designed to permit the strap to rotate around support 42. Two lever arms 40 extend from the strap. These arms are engaged by cam surface 30 on cam rail assembly 28 (not shown) to provide a twisting force on the strap 24. A number of flexible flat leaf spring elements 46 also extend from the strap. In the rest position the leaf spring elements 46 are substantially in the same plane as that defined by strap 24. In the prior art, all leaf spring elements 46 are substantially identical having the same cross-section and length. They are evenly distributed along the length of strap 24. As the cam surface 30 engages lever arms 40 applying a twisting action onto strap 24, the leaf spring elements 46 are twisted and apply pressure onto the backing plate 22 pushing it towards window plate 16. Air trapped between the intensifying screen 18 and a film sheet placed between screen 16 and 18 tends to push upwardly on backing plate 22 and resist moving plate 22 towards window plate 16. As a result, the strap 24 which is by necessity thin assumes a somewhat bowed configuration as shown in FIG. 2.

Figure 4:
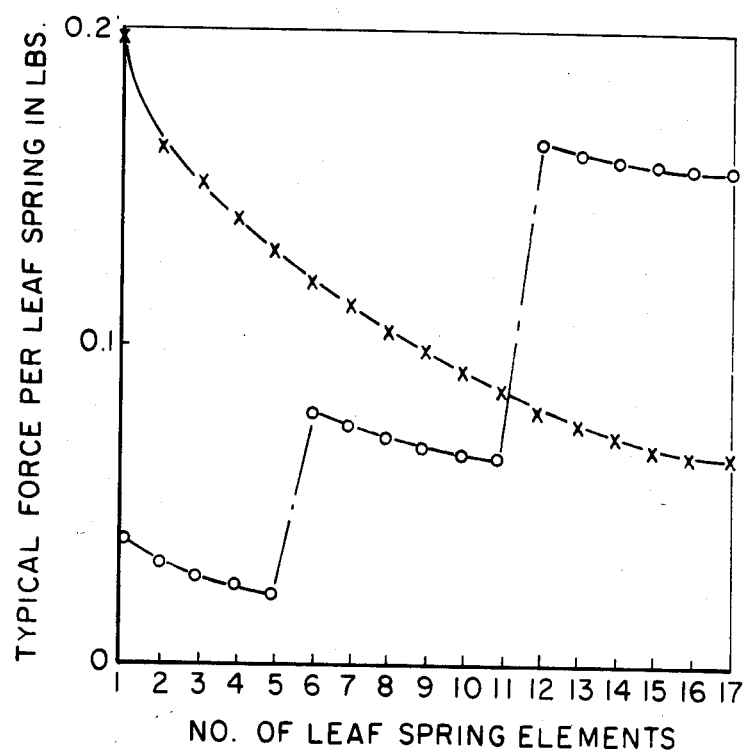
FIG. 4 is a graph showing the force applied to a screen backing plate when leaf spring elements of the type shown in FIG. 3 are employed and the pressure profile resulting from employment of leaf springs of the type described in the prior art.

FIG. 4 shows in schematic presentation the pressure profile of the pressure applied by each uniform size leaf of the spring elements (17 in number) known in the prior art from one end of a cassette towards the center point of the cassette. As can be seen, the pressure varies substantially. The result of this situation is that contact between the intensifying screens and a film sheet place in the cassette is less near the center of the cassette than the edges with a loss in resolution (curve marked by Xs).

Figure 3:
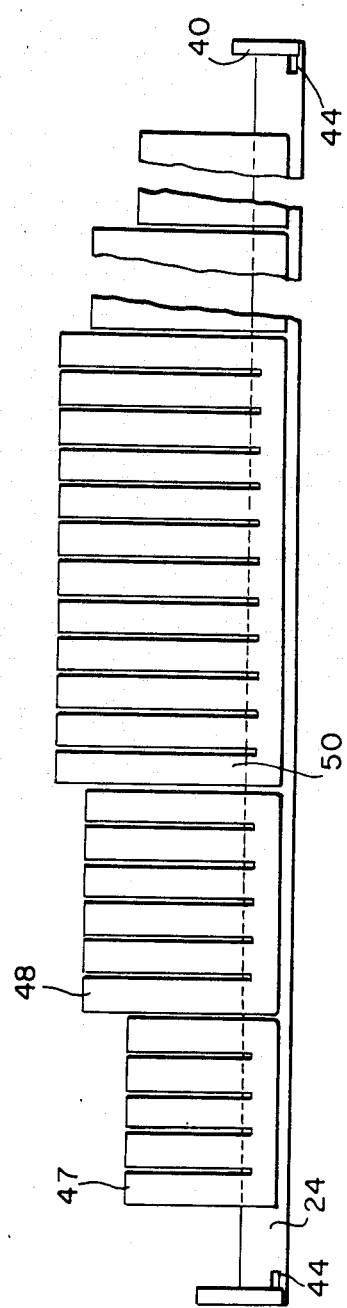
FIG. 3 is a schematic representation of leaf spring elements in accordance with the present invention.

Referring now to FIG. 3, there is shown a preferred embodiment of a leaf spring biasing element constructed in accordance with this invention. The biasing element again comprises a strap 24 including levers 40 and mounting openings 44 similar to the structure used previously. However, the leaf spring elements 47, 48, 50 extending in the plane of the strap arm no longer uniform along the length of the strap. As is shown in FIG. 3, the leaf spring elements become progressively longer and thicker in cross-section as we move from the edges of the cassette towards its center.

In the preferred embodiment for a cassette of 14×17 inch (35.56×43.18 cm) dimensions, a biasing element having three different size leaf springs is employed. The leaf springs begin at approximately one inch (2.54 cm) from the end of strap 24. The first set of five leaf springs 47 are 1.53 inches (3.89 cm) long and have a cross-section of 0.006 inch (0.152 mm) thick. The distance between each leaf spring is 0.03 inch (0.76 mm). A second set of six leaf springs 48 is adjacent to the first set. The second series of leaf springs are two inches (5.08 cm) long and 0.009 inch (0.229 mm) cross-section. A third set of six leaf springs 50, ecah 2.25 inches (~5.72 cm) long and 0.012 inch (0.305 mm) cross-section is used reaching the mid-point of the strap. The pattern is then inversely repeated to the end of the strap the 2.25 inch (~5.72 cm) leaf springs followed by the two inch (5.08 cm) leaf springs followed by the 1.53 (3.89 cm) leaf springs terminating one inch (2.54 cm) from the other end of the strap 24.

When an arrangement such as the one described above is used, the force applied onto the backing plate 22 varies along the plate. It is plotted in FIG. 4 and as is seen the force is largest in the center portion of the plate as compared to the edges (curves marked with circles). Thus, as the cam surface 30 engages lever arm 40, a larger force is applied in the center of backing plate 22 preferentially urging the center towards window plate 16. Thus, the center tends to bow towards window plate 16 and contact is believed to be first established near the center of the plate pushing air away from the center towards the extremities. This is similar to the effect of having a bowed plate as is common in the book type cassettes which prevents air entrapment and results in better contact between the screens and the film.

While the material used for the leaf springs is fully hardened stainless steel type 301, the material per se is not critical. What is important is the creation of a profile of pressure across the width of the backing plate to assure that higher force is applied to the center of the plate rather than the ends as shown in FIG. 4.

In one embodiment, a portion of the screen 18 is bent along its edges contiguous the bucklers 12 in a direction away from film sheet 32 and toward the window plate 16. The portion of the screen bent towards window plate 16 preferably extends the full length of the sides of the screen adjacent one or both channels 14S. The bent angle which is defined as the acute angle between the planes of the screen 18 and the bent edges, being between about 15° and 40°, a preferred range between about 20° and 30°. The bent portion of the screen 18 may compress the foam pad 17 or the edge of the pad may be tapered or otherwise shaped to fit under the screen. In determining the width of the bent portion of the screen as measured from the outside edge toward the inner portion of the screen, the maximum combination of angle and length is such that the underside edge of the screen 18 contacts the surface plate 16. In practical terms this is about 1/16 to ⅛ of an inch (1.588 to 3.175 mm) for an X-ray cassette capable of handling 14×17 inch (35.36×43.18 cm) film sheets. Typical foam pad thickness is about 0.1 inch (0.254 cm).

The bent portion of screen 18 may extend only partially along the edge adjacent a channel 14S; so long as one buckler is operating in the cut out along the bent portion, quick release of the film is obtained. It is also desirable that the foam pad 17 be secured along its full surface on window plate 16 and held firmly thereto.

In a preferred embodiment, the screen 20 mounted on the moveable plate 22 is mounted using a layer of adhesive that does not cover the full back surface of the screen. The screen is attached to the back plate leaving three 18 mm wide strips extending along side rails 14S and 14L.

I claim:
1. In an X-ray cassette of the type having a casing,
a fixed plate and a moveable plate within said casing,
a film-sheet receivable between the plates,
bias means including a cam riding surface for biasing the moveable plate toward the fixed plate by applying a biasing force.
an actuating cam assembly operatively associated with the bias means to engage the cam-riding surface and release the biasing force from the moveable plate when the cam assembly is in a first position and apply the biasing force when the cam assembly is in a second position,
the bias means including at least one pressure applying strap comprising a plurality of leaf spring elements mounted on a supporting arm extending therefrom in a plane.
the strap extending across the moveable plate,
the improvement comprising a plurality of leaf spring elements of variable cross-section and length,
the cross-section and length of the leaf spring elements away from the edges of the moveable plate being respectively larger and longer than the cross-section and length of the leaf spring elements adjacent the edges of the moveable plate.

2. A cassette according to claim 1 wherein an intensifying screen is secured over the fixed plate, the intensifying screen having at least a portion of at least one of its edges bent away from said moveable plate.

3. A cassette according to claim 1 wherein there is present a generally rectangular casing having a film entry slot in one of its edges and the moveable plate is also generally rectangular, having a top edge extending adjacent to and parallel to the film entry slot and right and left edges extending substantially perpendicular to and away from the top edge.

4. The cassette according to claim 3 wherein an intensifying screen is placed between the fixed and the moveable plate and secured to the fixed plate, the intensifying screen having at least a portion of one of the right or left edges bent in a direction away from the moveable plate.

5. A cassette according to claim 4 wherein at least one buckler element is present along one edge of the fixed plate operatively associated with the cam assembly pivotally mounted on the casing to extend in the space between the first and moveable plates to engage an edge of the film sheet to buckle the same from the plate.

* * * * *

UNITED STATES PATENT AND TRADEMARK OFFICE
CERTIFICATE OF CORRECTION

PATENT NO. : 4,688,243

DATED : August 18, 1987

INVENTOR(S) : DeFelice et al.

It is certified that error appears in the above-identified patent and that said Letters Patent is hereby corrected as shown below:

In Column 6, line 65, the word "first" should be --fixed--.

Signed and Sealed this

First Day of March, 1988

Attest:

DONALD J. QUIGG

*Attesting Officer*  *Commissioner of Patents and Trademarks*